US009151535B2

(12) United States Patent
Wynnick et al.

(10) Patent No.: US 9,151,535 B2
(45) Date of Patent: Oct. 6, 2015

(54) STACKING BRACKET

(71) Applicant: Lennox Industries Inc., Richardson, TX (US)

(72) Inventors: David Michael Wynnick, Lewisville, TX (US); Timothy Grant Weigel, Richardson, TX (US); Christopher Whitesides, Providence Village, TX (US)

(73) Assignee: Lennox Industries Inc., Richardson, TX (US)

( * ) Notice: Subject to any disclaimer, the term of this patent is extended or adjusted under 35 U.S.C. 154(b) by 148 days.

(21) Appl. No.: 14/022,174

(22) Filed: Sep. 9, 2013

(65) Prior Publication Data

US 2015/0069208 A1    Mar. 12, 2015

(51) Int. Cl.

| | | |
|---|---|---|
| *F16M 1/00* | (2006.01) | |
| *F16M 3/00* | (2006.01) | |
| *F16M 5/00* | (2006.01) | |
| *F16M 7/00* | (2006.01) | |
| *F16M 9/00* | (2006.01) | |
| *F16M 11/00* | (2006.01) | |
| *F25D 23/10* | (2006.01) | |
| *B65D 6/00* | (2006.01) | |
| *F24F 13/32* | (2006.01) | |
| *B65D 67/02* | (2006.01) | |

(52) U.S. Cl.
CPC *F25D 23/10* (2013.01); *B65D 7/00* (2013.01); *B65D 67/02* (2013.01); *F16M 1/00* (2013.01); *F24F 13/32* (2013.01)

(58) Field of Classification Search
CPC ..... F16M 5/00; F16M 2200/08; F16M 13/00; F16M 11/00; F16M 7/00; F16M 11/10; F16M 11/22; F16M 1/00; A47B 13/021; A47B 91/00; F24F 13/32; B65D 69/00; F25D 23/10

See application file for complete search history.

(56) References Cited

U.S. PATENT DOCUMENTS

| | | | | |
|---|---|---|---|---|
| 3,018,526 | A * | 1/1962 | Rieberl | 403/187 |
| 3,448,949 | A * | 6/1969 | Kelley | 267/140.3 |
| 5,016,853 | A * | 5/1991 | Cox | 248/523 |
| 5,657,868 | A * | 8/1997 | Taylor | 206/423 |
| 6,518,499 | B1 * | 2/2003 | Kessler | 174/50 |
| 6,530,191 | B2 * | 3/2003 | Rieke et al. | 52/794.1 |
| 6,631,878 | B1 * | 10/2003 | Adam | 248/188.4 |
| 6,776,380 | B1 * | 8/2004 | Kirk et al. | 248/188 |
| 6,892,991 | B1 * | 5/2005 | Soh | 248/188.2 |
| 8,074,952 | B2 * | 12/2011 | Baechle | 248/346.03 |
| 2002/0100854 | A1 * | 8/2002 | Stansbury | 248/632 |
| 2007/0108359 | A1 * | 5/2007 | Lee et al. | 248/372.1 |
| 2008/0251674 | A1 * | 10/2008 | Su | 248/346.04 |
| 2011/0285228 | A1 * | 11/2011 | Umehara et al. | 310/81 |
| 2012/0228974 | A1 * | 9/2012 | Rinaolo et al. | 310/91 |

* cited by examiner

*Primary Examiner* — Brian D Mattei
(74) *Attorney, Agent, or Firm* — R. Johnston Law, PLLC

(57) ABSTRACT

The present invention provides for an apparatus for supporting stacking of a top heating, ventilation, and air conditioning (HVAC) unit on top of a bottom HVAC unit. The apparatus includes a base member configured to mount to a top cover of the bottom HVAC unit. The base member comprises an upper base portion with a top surface configured to receive at least a portion of a base rail of the top HVAC unit. The apparatus further comprises a stacking insert extending away from the base member. The stacking insert has one or more sloped surfaces extending above the top surface of the upper base portion. The top surface extends from a base of the one or more sloped surfaces in a plane substantially parallel to the top cover, when the base member is mounted to the top cover of the bottom HVAC unit.

17 Claims, 7 Drawing Sheets

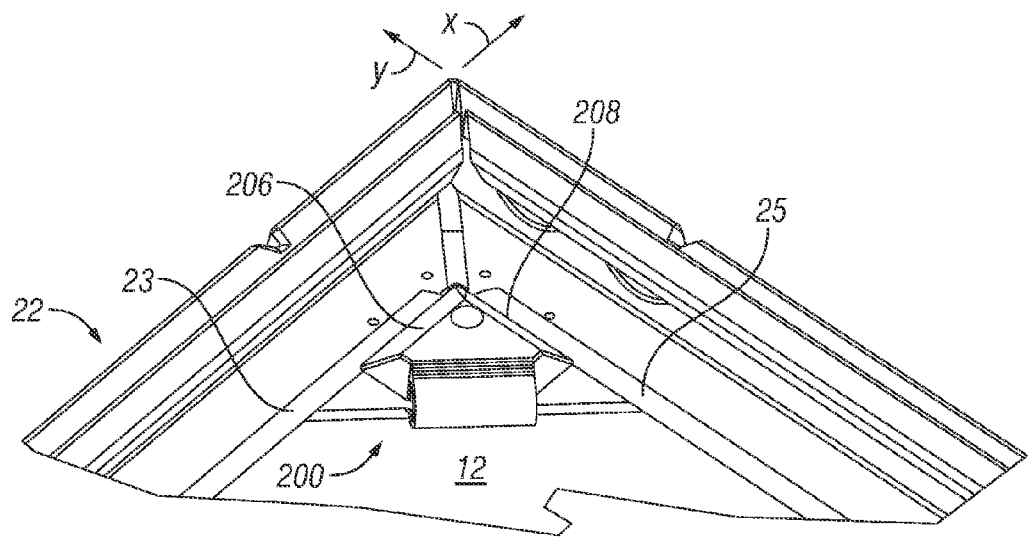
FIG. 11
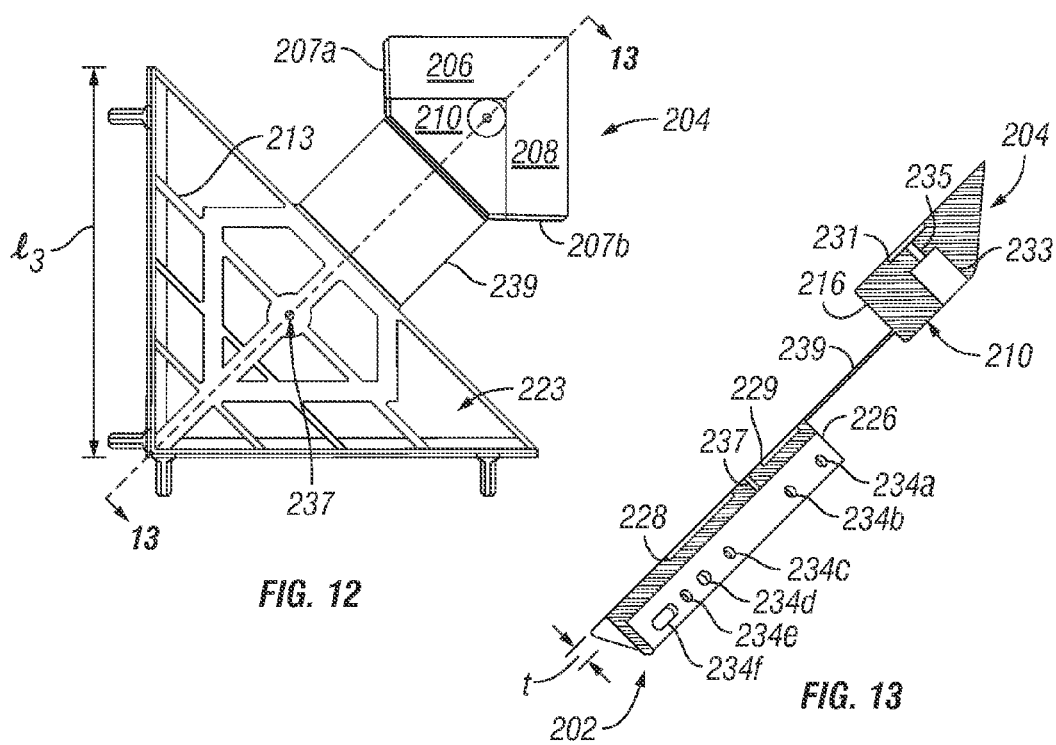
FIG. 12
FIG. 13

STACKING BRACKET

BACKGROUND

1. Field of the Invention

The present invention relates to stacking of heating, ventilation, and air conditioning units and, more particularly, to devices to support stacking heating, ventilation, and air conditioning units.

2. Description of Related Art

Heating, ventilation, and air conditioning (HVAC) units are typically transported in an enclosed van or on a flatbed. Wood crating members mounted around the HVAC unit provide protection to the surfaces and internal components of the HVAC unit when the HVAC units are bumped, jostled, or otherwise disturbed during transport.

The HVAC units may be stacked one top HVAC unit on a bottom HVAC unit because of space constraints and to save on transportation costs. The wood crating members may provide protection to the top surface of the HVAC bottom unit by separating the bottom of the top HVAC unit, referred to as a rail, from the top surface. Wood crating may also be used in the storage of stacked HVAC units, for example storage at a warehouse.

An HVAC unit may also be strapped to a flatbed truck, either as a single HVAC unit where one or more straps extend across the top of the single HVAC unit or in a stacked configuration, where the straps extend across the top of the top HVAC unit.

The use of wood crating increases the materials and labor costs related to storage or transport of HVAC units. The wood crating further increases costs to contractors that install the HAVC units and generates waste that must be disposed of by the contractors or the HVAC unit owners. Accordingly, devices or methods are needed that reduce or eliminate materials and labor costs and waste related to the protection of the surfaces and internal components of the HVAC units during transport and storage.

SUMMARY

The present invention provides an apparatus for supporting stacking of a top heating, ventilation, and air conditioning (HVAC) unit on top of a bottom HVAC unit. The apparatus comprises a base member configured to mount to the top cover of the bottom HVAC unit. The apparatus further comprises a stacking insert extending away from a top surface of the base member. The stacking insert has one or more sloped surfaces extending above the top surface of the base member.

BRIEF DESCRIPTION OF THE DRAWINGS

For a more complete understanding of the present invention and the advantages thereof, reference is now made to the following Detailed Description taken in conjunction with the accompanying drawings, in which:

FIG. 11 is a view of the position of a second stacking bracket mounted on a bottom HVAC unit relative to a base rail of a top HVAC unit, wherein only the base rail of the top HVAC unit is shown for clarity;

FIGS. 12 and 13 are a bottom view and a cross-sectional view taken along line 13-13 of the bottom view, respectively, of a second stacking bracket;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning well-known features and elements have been omitted inasmuch as such details are not considered necessary to obtain a complete understanding of the present invention, and are considered to be within the understanding of persons of ordinary skill in the relevant art.

Stacking Bracket Having Sloped Surfaces 106, 108

Figure 1:
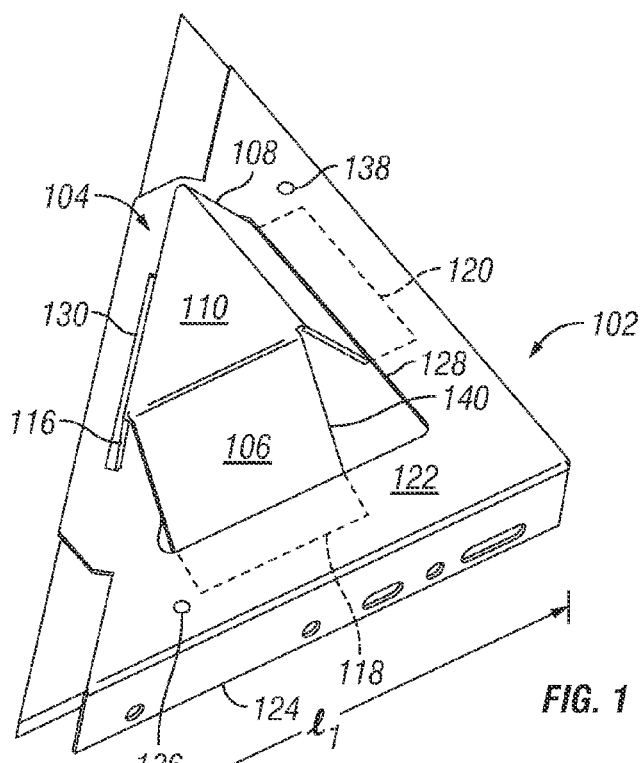
FIG. 1 is a perspective view of a first stacking bracket.
Figure 2:
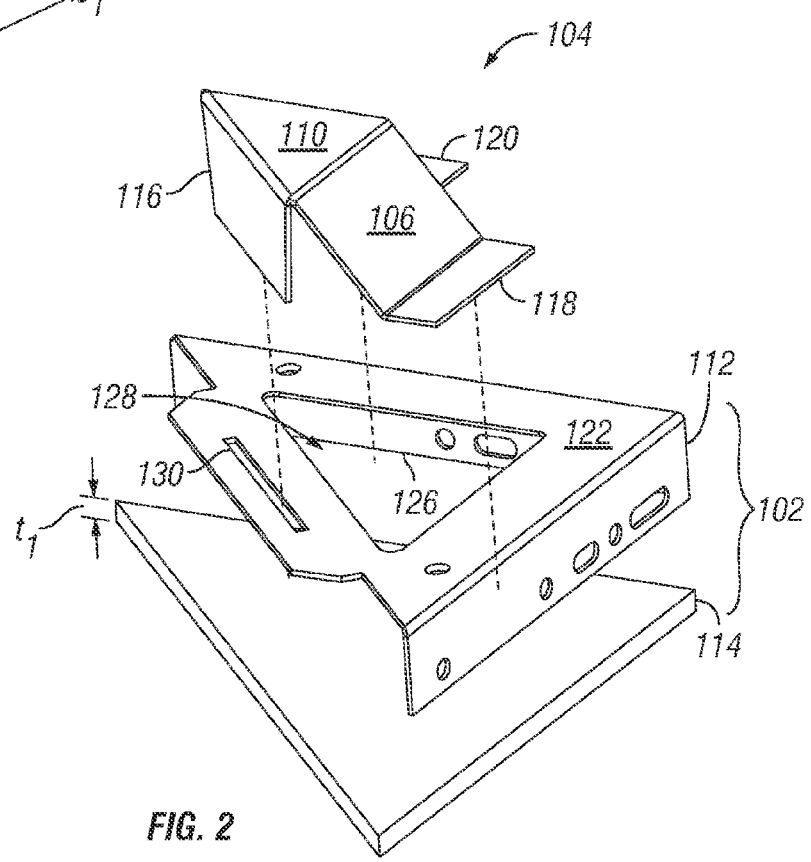
FIG. 2 is an exploded view of a first stacking bracket.

Referring to FIGS. 1 and 2, in a first embodiment, a first stacking bracket 100 for stacking a top HVAC unit (referred to as a "unit") on a bottom unit may comprise a base member 102 and a stacking insert 104. The first stacking bracket 100 is configured to be mounted to a top cover 12 (shown in FIG. 3A) of a bottom unit 10. In some embodiments, the first stacking bracket 100 is attached to a corner 16 of the bottom unit 10, as shown in FIGS. 3B and 4.

As shown in FIG. 1, the first stacking insert 104 may be coupled to the base member 102. The stacking insert 104 may comprise one or more substantially sloped surfaces 106, 108 extending from a top surface 110 of the stacking insert 104 to a top surface 122 of the base member 102, when the base member 102 and stacking insert 104 are coupled and mounted to the bottom unit 10. The sloped surfaces 106, 108 may be configured to impede displacement of a top unit 20 that has been stacked on top of the bottom unit 10.

Figure 4:
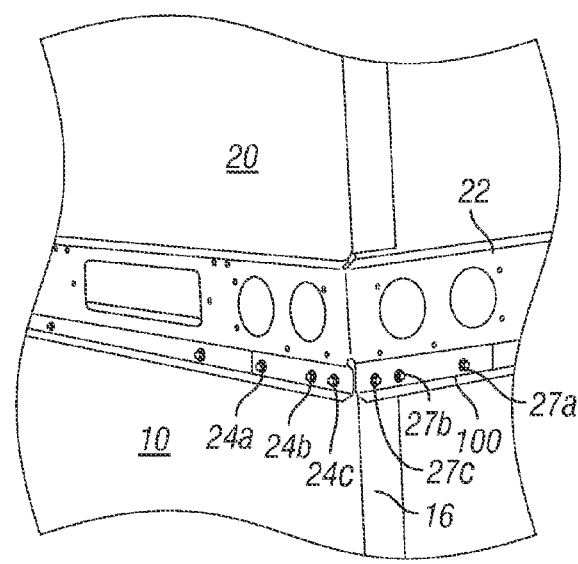
FIG. 4 is a view of a top HVAC unit stacked on top of a HVAC bottom unit having a first stacking mounted on the bottom HVAC unit.
Figure 5:
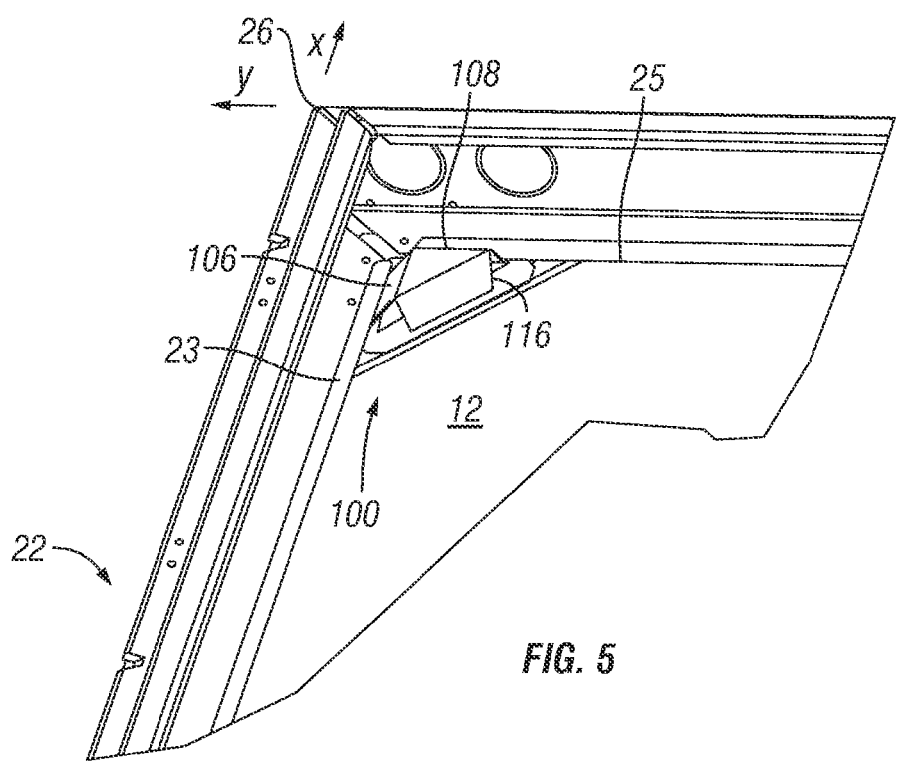
FIG. 5 is a view of the position of a first stacking bracket mounted on a bottom HVAC unit relative to a base rail of a top HVAC unit, wherein only the base rail of the top HVAC unit is shown for clarity.

Referring to FIGS. 4 and 5, the top unit 20 may be stacked on top of the bottom unit 10 to position the stacking insert 104 within the perimeter of a base rail 22 of the top unit 20. The sloped surfaces 106, 108 of the stacking insert 104 may be positioned adjacent to inner walls 23, 25 of the base rail 22 of the top unit 20.

Figure 6:
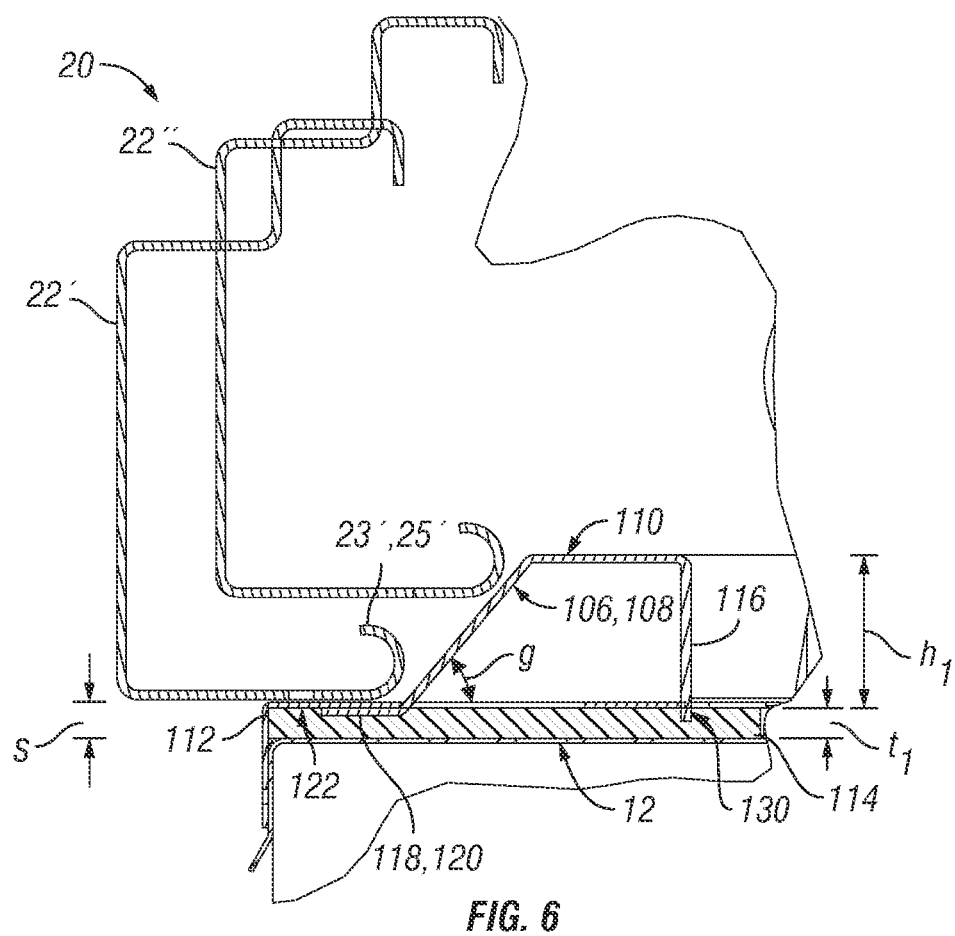
FIG. 6 is an illustration of a cross-sectioned view of a first stacking bracket mounted on a bottom HVAC unit showing the position sloped surfaces of the first stacking bracket relative to a base rail of a top HVAC unit in a first and second position.

Referring to FIGS. 5 and 6, the sloped surfaces 106, 108 may resist disengagement of the top unit 20 from its stacked configuration, when the top unit 20 is rocked or bumped to disturb its placement on the bottom unit 10. In the embodiment shown in FIG. 5, the sloped surfaces 106, 108 are positioned adjacent to the corner 26 formed by a base rail 22 of the top unit 20.

As shown in FIG. 6, the top unit 20 may be rocked due to a disturbance force applied to the top unit 20, as may be experienced during transport of the top unit 20. This disturbance force may cause a portion of the base rail 22', shown in a first original position, to lift above the top cover 12. FIG. 6 also shows the base rail 22" in a second disturbed position.

As shown in FIGS. 1 and 6, the top surface 122 of the base member 102 may extend around at the base portion of the sloped surfaces 106, 108, where the sloped surfaces 106, 108 meet the top surface 122, to provide a surface for the base rail 22' to rest on in the original position or for the rail 22" to come to rest to from the disturbed position. The top surface 122 be substantially flat and may extend in a plane substantially parallel to the HVAC top surface, when the base member is mounted to the HVAC top surface of the bottom unit. It will be understood that the top surface 122 may have other configurations, e.g. a cupped or bowl surface, for promoting stability of the stacked configuration of the top unit 20 on the bottom unit 10.

The sloped surfaces 106, 108 may function as a ramp or an impact surface or both. Because of the proximity of the walls 23', 25' of the base rail 22 to the sloped surfaces 106, 108, the base rail walls 23', 25' may impact, recoil from, or ride up and along the sloped surfaces, when the top unit is rocked or bumped by the disturbance force. The weight of the top unit and the inclination of the sloped surfaces 106,108 may impede upward movement of the base rail 22" causing the top unit 20 to slide down the sloped surfaces 106, 108 and back toward the original stacked configuration, for example the position of base rail 22' in the first original position.

Figure 7A:
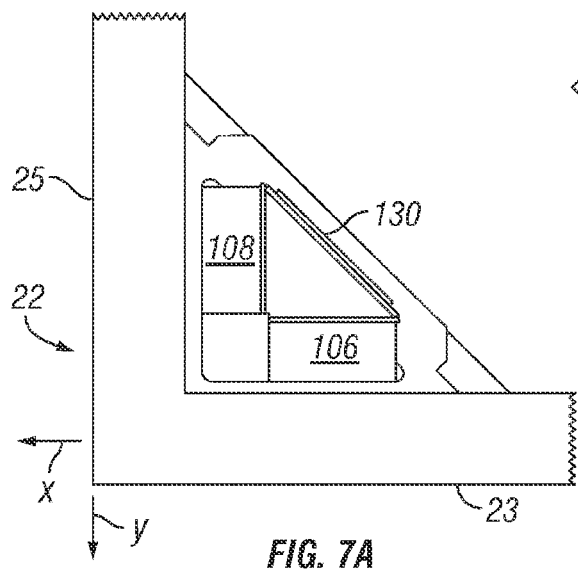
FIGS. 7A and 7B are a top view and a back view of a first stacking bracket, respectively, wherein the top view (FIG. 7A) shows the position of a base rail of a top HVAC unit relative to sloped surfaces of the first stacking bracket.

Referring to FIG. 6, the sloped surfaces 106, 108 may be configured substantially to face an adjacent portion of the walls 23, 25 of the base rail 22. The sloped surfaces 106 and 108 may comprise a general wedge shape. As shown in FIGS. 5 and 7A, each sloped surface 106 and 108 may extend in a direction parallel to a respective adjacent portion of the base rail 22. Sloped surface 106 may extend in a direction x parallel to first wall 23, and sloped surface 108 may extend in a direction y parallel to second wall 25.

As shown in FIG. 6, the sloped surfaces 106, 108 may comprise a sloped profile. In some embodiments, the slope is constant extending at an angle g, relative to the top cover 12. The slope may comprise a range from about 30 to 70°.

Figure 8:
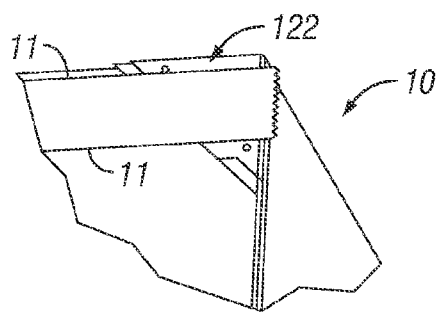
FIG. 8 is an illustration of the position of a strap used to secure a bottom HVAC unit to a flatbed truck relative to a first stacking bracket that is mounted to the bottom HVAC unit.

In some embodiments, the first insert 104 may be removeable to allow for the use of straps to secure the bottom unit 10 to a flatbed truck. Referring to FIG. 8, a strap 11 may lie cross along at least a portion of the top surface 122 of the base member 102. Removing the insert 104 allows the straps to lie across a substantially flat surface across the top of the base member 102 that provides substantially a continuous flat surface across the top cover 12 of the bottom unit 10.

First Stacking Bracket 100

Referring to FIGS. 1, 2, and 3B, the base member 102 of the first stacking bracket 100 may comprise an upper base portion 112 and a lower base portion 114. The first insert 104. The first insert 104 may further comprise a brace member 116, extending from the top 110, and mounting tabs 118, 120 extending from a bottom part of the sloped surfaces 106, 108. The sloped surfaces 106, 108 are inclined relative to the mounting tabs 118, 120 and are configured to be inclined relative to the top cover 12 of the bottom unit 10 and the top surface 122, when the first stacking bracket 100 is mounted to the bottom unit 10.

Figure 3A:
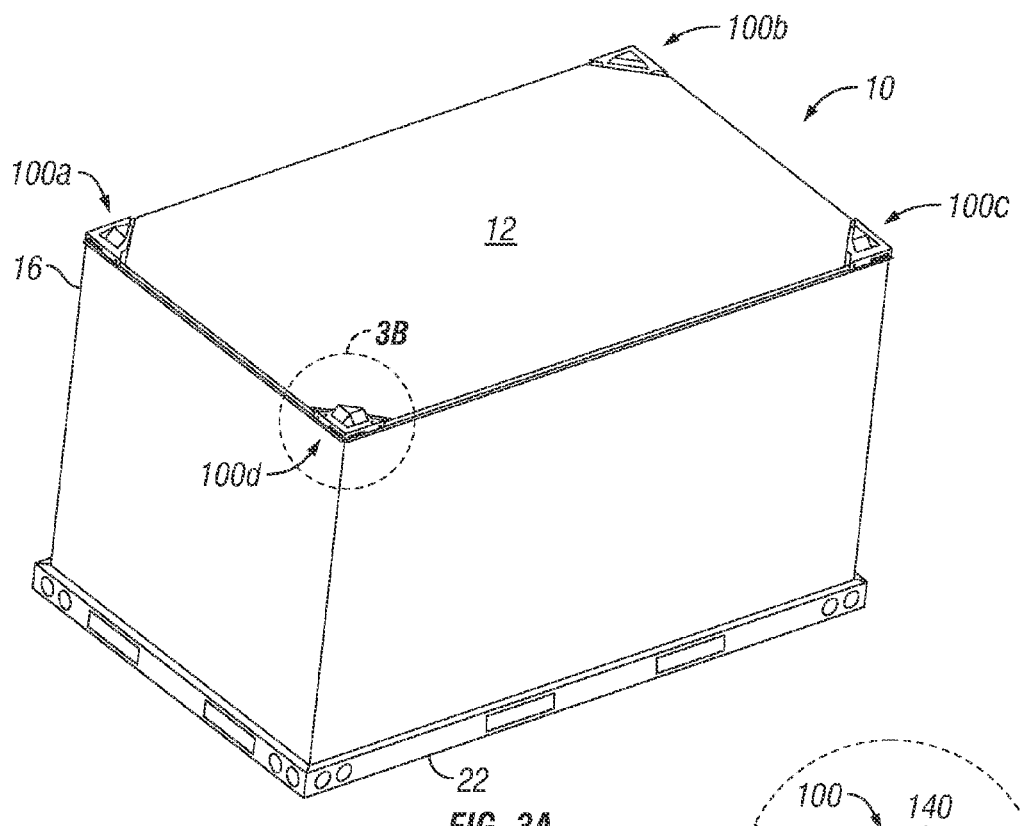
FIGS. 3A and 3B are a perspective view and detailed view, respectively, of a system of first stacking brackets mounted on four upper corners of a bottom HVAC unit.
Figure 3B:
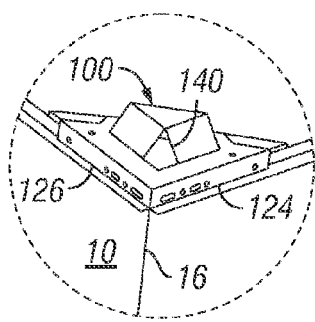

Referring to FIGS. 1, 2 and 3A, the upper base portion 112 comprises a size and shape configured to fit over a corner 16 of the bottom unit 10. In the embodiment shown, the upper base portion 112 may form a triangular wedge shape that has a top surface 122 that fits on top of the top cover 12 of the bottom unit 10 and that has flanges 124, 126 that extend over side surfaces of the bottom unit 10 (as shown in FIGS. 3A and 3B). The top surface 122 and the flanges 124, 126 may protect corners (e.g. corner 16) of the bottom unit 10 and prevent damage to the top unit 20.

In some embodiments, as shown in FIG. 1, each flange 124, 126 may comprise a flange length $l_1$. The flanges 124, 126 may be configured symmetrically to have the same length $l_1$. The length $l_1$ may comprise 6 with a range of about 3-14 in (depending on the size of the product). It will be understood by persons of ordinary skill in the art that the length $l_1$ may be varied to vary the area that the first stacking bracket 100 covers on the top cover 122 of the bottom unit 10.

Referring to FIGS. 1 and 2, the top surface 122 of the upper base portion 112 may comprise a first hole 128 extending through the top surface 122. The first hole 128 may comprise a size and shape configured to receive a portion of the first insert 104. The upper base portion 112 further comprises a brace slot 130 configured to receive a portion of the brace member 116 of the first insert 104.

Referring to FIGS. 2 and 6, the lower base portion 114 may comprise a flat member configured to be positioned between the top surface 122 of the upper base portion 112 and the top cover 12 of the bottom unit 10. The shape of the lower base portion 114 may have a similar triangular wedge shape to fit within the top surface 122 and flanges 124, 126 of the upper base portion 112.

Referring to FIGS. 2 and 6, the lower base portion 114 may have a thickness $t_1$ configured to provide separation s between the bottom of the base rail 22 of the top unit 20 and the top cover 12 of the bottom unit 10. The separation s includes the thickness of the top surface 122. The thickness $t_1$ providing the separation s also accounts for flexing and bending of the base rail 22 that occurs due to the weight of the top unit 20 when it is stacked on the bottom unit 10. In some embodiments, the thickness $t_1$ may comprise 0.3 inches (in.) with a range of about 0.25 in.-about 1.25 in., and the separation s may comprise 0.345 in. with a range of about 0.03-about 1.25 in. It will be understood by persons of ordinary skill in the art that the thickness $t_1$ and the thickness of the top cover 122 can be varied to vary the separation s.

Referring to FIGS. 1, 2, and 6, the first stacking bracket 100 may be assembled and mounted to the bottom unit 10 by placing the top 110, brace member 116, and sloped surfaces 106, 108 of the first insert 104 through the first hole 128 to extend above the top surface 122 of the upper base portion 112. The mounting tabs 118, 120 are positioned under the top surface 122, and the brace member 116 is inserted into the brace slot 130.

Referring to FIGS. 1, 5, 6, and 7B, the brace member 116 may comprise a tapered shape to allow a bottom portion of the brace member 116 to wedge into the brace slot 130 to secure the brace member 116. As shown in FIG. 6, the sloped surfaces 106, 108 may extend above the top surface 122 to a height $h_1$. The height $h_1$ may comprise about 1.5 in. within a range of about 1.5-3.0 in.

The wedging of the brace member 116 in the slot 130 may be configured to support the sloped surfaces 106, 108 at about the same height $h_1$. The brace member 116 may further prevent the first insert 104 from being crushed and it may lock the first insert 104 in place to prevent unintended removal.

Figure 7B:
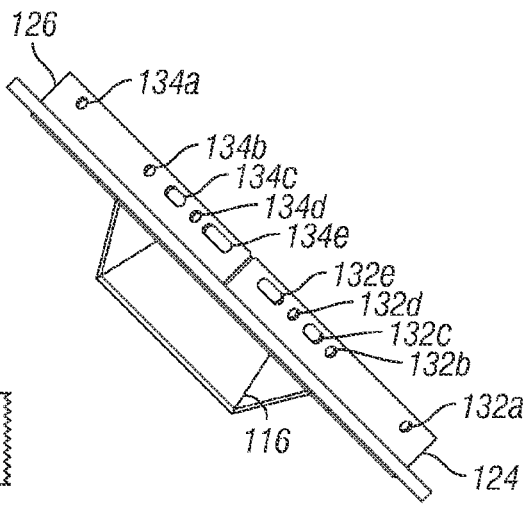

Referring to FIGS. 4, 6, and 7B, the lower base portion 114 may be fit under top surface 122 so that the lower base portion 114 makes contact with the mounting tabs 118, 120. These parts of the first stacking bracket 100 may be placed onto a first corner 16 of the bottom unit 10. One or more fastener apertures 132a-e and 134a-e extending along the flanges 124 and 126, respectively, may align with apertures (not shown) in the side surfaces of the bottom unit 10. Fasteners, such as screws 27a-c and 24a-c, may pass through the one or more fastener apertures 132a-e and 134 a-e, respectively, to threadably engage the apertures in the side surfaces to secure the first stacking bracket 100 to the bottom unit 10.

Referring to FIG. 6, securing the first stacking bracket 100 to the bottom unit 10 may compress the lower base portion 114 and the mounting tabs 118, 120 between the top surface 122 of the upper base portion 112 and the top cover 12. This compression may align the mounting tabs 118,120 in parallel with the top cover 12 and position the sloped surfaces 106, 108 so that the slope surfaces 106, 108 extend from the top surface 122 at an angle g relative to the top cover 12.

Referring to FIGS. 1 and 6, the lower base portion 114 may be held in place by nail pierce protrusions 136, 138 which extend downward from the top surface 122 of the upper base portion 112 to make contact with the lower base portion 114. These protrusions may be formed by piercing the top surface with a hole punch.

In some embodiments, the lower base portion 114 is made of corrugated plastic. The compressible surfaces of the corrugated plastic allows the protrusions 136, 138 of the nail pierce to sink the upper surface of the lower base portion 114 increasing the resistance of the lower base portion to sliding or displacement, when the first stacking bracket 100 is mounted to the bottom unit 10. It will be understood by persons of ordinary skill in the art that other suitable materials may be used for the lower base portion 114, for example cardboard.

In some embodiments, the upper base portion 112 and the first insert 104 may be made from sheet metal. It will be understood by persons of ordinary skill in the art that other suitable materials may be used for the upper base portion 112 and the first insert 104, for example other metals, plastics or composite materials.

In some embodiments, the first insert 104 is configured for removal to support using straps to secure the bottom unit 10 to a flatbed truck. Referring to FIG. 3B, a lever device (not shown), such as claw hammer or screwdriver, may be positioned within a gap 140 between the sloped surfaces, 106, 108 to pry the brace member 116 from the brace slot 130 (shown in FIG. 6) while the first stacking bracket 100 is mounted to the bottom unit 10. The first insert 104 may be manually removed from its connection to the upper base portion 112 by pulling the first insert 104 so that the mounting tabs 118, 120 slide out from under the top surface 122. The first insert 104 may be discarded or re-used.

Referring to FIG. 8, removal of the first insert 104 detaches the sloped surfaces 106, 108 from the top surface 122, and removes the first insert 104 as an obstruction in the plane in which the top surface 122 extends. With the sloped surfaces 106, 108 detached, the top surface 122 may extend in an uninterrupted, continuous plane to provide a substantially flat surface to receive a strap 11 on portions of the top surface 122 for securing the bottom unit 10.

As shown in FIGS. 3A and 4, one or more first stacking brackets 100a-d may be used in combination as part of a system to support stacking of the bottom unit 10 on the top unit 20. As shown in FIG. 3A, each first stacking bracket 100a-d is mounted on each of the four corners of the top cover 12 of the rectangular-shaped bottom unit 10. The first stacking brackets 100 a-d may have substantially the same configuration relative to the rail 20 of the top unit 20, as described for first stacking bracket 100 in FIGS. 1, 2, 5, 6, 7A, and 7B.

In the system shown in FIGS. 3A and 4, the stacking insert 104 of each stacking bracket 100a-d may be positioned within the perimeter of the base rail 22 so that each stacking bracket 100a-d is supporting a portion of the base rail 22 in the manner described above (e.g. as shown in FIG. 5). Having the same configuration allows the first stacking brackets 100a-d to work in combination to resist disengagement of the top unit 20 from its stacked configuration, when the top unit 20 is rocked or bumped to disturb its placement on the bottom unit 10.

Second Embodiment of a Stacking Bracket

Figure 9:
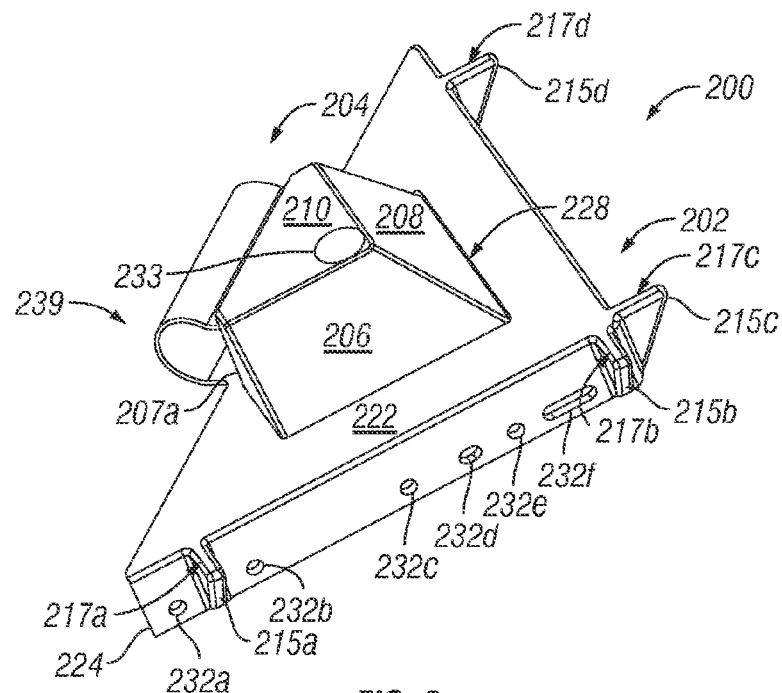
FIG. 9 is a perspective view of a second stacking bracket.

FIG. 9 illustrates a second embodiment of a stacking bracket for stacking the top unit 20 on the bottom unit 10. A second stacking bracket 200 may replace, as an alternative, the first stacking bracket 100 in the configurations shown in FIGS. 3A and 4.

Referring to FIG. 9, the second stacking bracket 200 may comprise some similar features as the first stacking bracket 100, shown in FIGS. 1 and 2. Second stacking bracket 200 may comprise a second insert 204 coupled to a second base member 202. In a manner similar to the first stacking bracket 100, the second insert 204 may comprise sloped surfaces 206, 208 inclined relative to a top surface 222 of the base member 202. The second stacking insert 200 may further be used as part of the system shown and described in Figure FIGS. 3A and 4.

Figure 10:
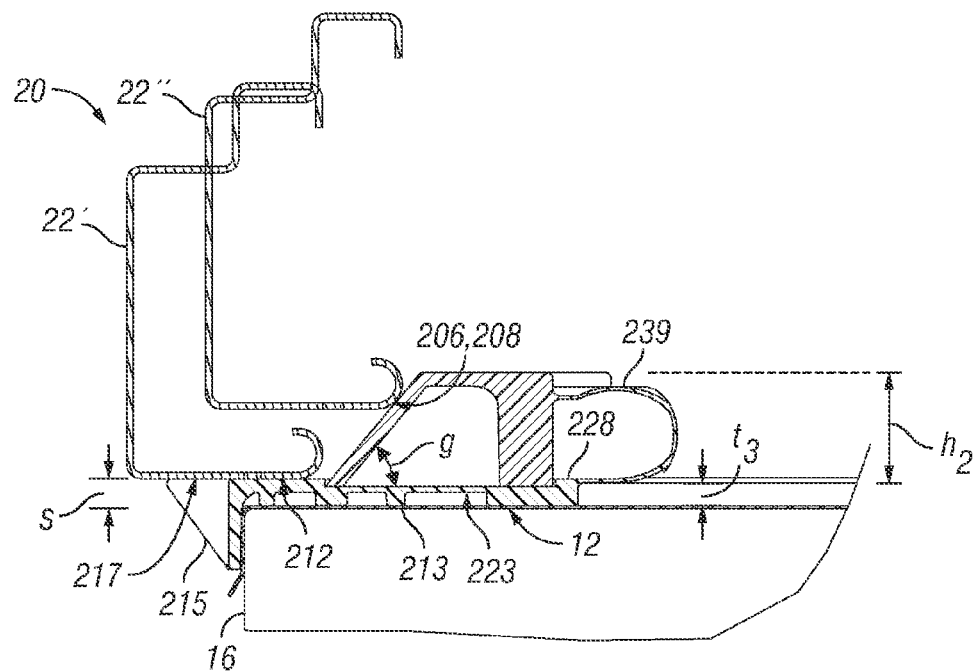
FIG. 10 is a cross-sectional view of a second stacking bracket mounted on a bottom HVAC unit showing the position sloped surfaces of the second stacking bracket relative to a base rail of a top HVAC unit in a first and second position.

Referring to FIGS. 10 and 11, the top unit 20 may be rocked due to a disturbance force applied to the top unit 20, as may be experienced during transport of the top unit 20. This disturbance force may cause a portion of the base rail 22', shown in a first original position, to lift above the underlying surface of the bottom unit 10. FIG. 10 shows the base rail 22" in a second disturbed position.

Referring to FIG. 10, the sloped surfaces 206, 208 may resist disengagement of the top unit 20 from its stacked configuration, when the top unit 20 is rocked or bumped to disturb its placement on the bottom unit 10. The sloped surfaces 206, 208 may function as a ramp or an impact surface or both, in a manner similar to that described for the first stacking bracket 100. As shown in FIG. 10, the sloped surfaces 206, 208 may extend above the top surface 222 to a height $h_2$. The height $h_2$ may comprise about 1.5 in. within a range of about 1.5-3.0 in.

In a manner substantially similar to that described for the first stacking bracket 100, the sloped surfaces 206, 208 of the second stacking bracket 200 may function as a ramp or an impact surface or both. Because of the proximity of the walls 23, 25 of the base rail 22 to the sloped surfaces 206, 208, the base rail walls 23, 25 may impact, recoil from, or ride up and along the sloped surfaces, when the top unit is rocked or bumped by the disturbance force. The weight of the top unit 20 and the inclination of the sloped surfaces 206,208 may impede upward movement of the base rail 22" causing the top unit 20 to slide down the sloped surfaces 206, 208 and back toward the original stacked configuration, for example the position of base rail 22' in the first original position. The base rail 22" may comprise a rolled-up portion, which may further promote sliding movement of the base rail 22", when the base rail 22" is in the disturbed position.

The base rail 22', in the original or at rest position, rests on the top surface 122. The length of the portion of the top surface 122 may provide further surface area for the base rail 22' to slide and react to a disturbance force, which may dissipate energy from rocking or bumping of the top unit 20 in a non-damaging manner.

Referring to FIG. 11, the sloped surfaces 206, 208 may be configured substantially to face an adjacent portion of the walls 23, 25 of the base rail 22. The sloped surfaces 206 and 208 may comprise a general wedge shape. Each sloped surface 206 and 208 may extend in a direction parallel to a respective adjacent portion of the walls 23, 25 of the base rail 22. Sloped surface 206 may extend in a direction x parallel to first wall 23, and sloped surface 208 may extend in a direction y parallel to second wall 25.

As shown in FIG. 10, the sloped surfaces 206, 208 may comprise a sloped profile. In some embodiments, the slope is constant extending at an angle g, relative to the top cover 12. The slope angle g may comprise a range from about 30 to 70°. The sloped surfaces 206, 208 may function in a similar manner as the sloped surfaces 106, 108 of the first stacking bracket 100, described above, as a ramp or an impact surface or both.

Referring to FIGS. 9, 11, and 12, the second insert 204 may comprise a top surface 210 having the sloped surfaces 206, 208, side surfaces 207a and 207b, and a back surface 216 extending from the edges of the top surface 210 towards a top surface 222 of the second base member 202. These side surfaces 207a, 207b and back surface 216 comprise walls of generally uniform thickness that resist crushing or buckling of the second insert 204. It will be understood by persons of ordinary skill in the art that the thickness of the walls may be varied to match the needs for strength or that the second insert 204 may comprise a substantially solid piece of material to maximize strength.

The second base member 202 comprises a size and shape configured to fit over a corner of the bottom unit 10 in a similar manner shown for the first stacking bracket 100 in FIGS. 3A and 4. In the embodiment shown in FIGS. 9 and 11, the base member 202 may form a triangular wedge shape. The top surface 222 fits on corner 16 (shown in FIG. 10) of the top cover 12 of the bottom unit 10.

Flanges 224, 226 are configured to extend over side surfaces of the bottom unit 10, in a manner similar to flanges 124, 126 of the first stacking bracket 100, shown in FIG. 3B. The top surface 222 and the flanges 224, 226 may protect corners of the bottom unit 10 and prevent damage to the top unit 20. The flanges 224, 226 may be configured symmetrically to have the same length $l_3$. The length $l_3$ may comprise 3.0 with a range of about 3.0-14 in.

Referring to FIGS. 10, 12 and 13, an underside of the base member 202 may comprise ribbing 213 extending along an undersurface 223 opposite from the top surface 222. The ribbing 213 combined with the top surface 222 may comprise a thickness $t_3$ configured to provide separation s between the bottom of the base rail 22 of the top unit 20 and the top cover 12 of the bottom unit 10. The thickness $t_3$ providing the separation s also accounts for flexing and bending of the base rail 22 that occurs due to the weight of the top unit 20 when it is stacked on the bottom unit 10.

The ribbing 213 further may increase strength in high stress areas along the base member 202. It will be understood by persons of ordinary skill in the art that the thickness $t_3$, including the thickness of the top surface 222 and ribbing 213 may be varied to vary the separation s and to vary the loads that the base member 202 may bear.

The ribbing 213 may be utilized to save on materials, while at the same time increasing strength in high stress areas. In some embodiments, the underside of the base member 202 may be a uniform surface with no ribbing structure to maximize strength across the entire underside of the base member 202.

Referring to FIGS. 9 and 10, the base member 202 may further comprise support members 215a-d. In some embodiments, each support member 215a-d (illustrated as support member 215 in FIG. 10) may comprise substantially a triangle shape to form a brace structure. A top support surface 217 of each support member 215a-d may extend substantially from the side surface of the bottom unit 10, when the second stacking bracket 200 is mounted to the bottom unit 10. The length of each top support surface 217 is configured to support a portion of the base rail 22 of the top unit. As shown in FIG. 10, the support members each support member 215 may reduce stress on the top unit 20 by providing additional surface area along the top support surface 217 to bear the weight of the top unit 20 which is transferred through the rail 22', when stacked on the bottom unit 10.

The second stacking bracket 200 may be mounted to a bottom unit 10 in a manner similar to that as the first stacking bracket 100, as shown in FIGS. 3A and 4. The second stacking bracket 200 may be placed onto a first corner 16 of the bottom unit 10. Referring to FIGS. 9 and 13, one or more of fastener apertures 232a-e and 234 a-e extending along the flanges 224 and 226, respectively, may align with apertures (not shown) in the side surfaces of the bottom unit 10. Fasteners, such as screws 24a-c and 27a-c (shown in FIG. 4), may pass through the one or more fastener apertures 232a-e and 234a-e, respectively, to threadably engage the apertures (not shown) in the side surfaces to secure the second stacking bracket 200 to the bottom unit 10.

Figure 14:
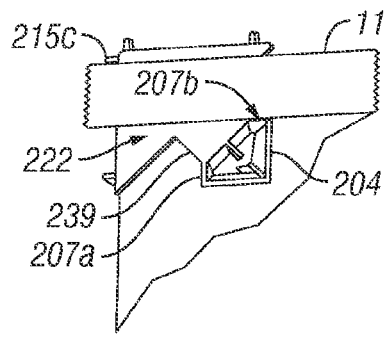
FIG. 14 is an illustration of the position of a strap used to secure a bottom HVAC unit to a surface, such as a flatbed truck, relative to a second stacking bracket that is mounted to the bottom HVAC unit.

Referring to FIGS. 12, 13, and 14, the second insert 204 may configured to be detachable from the top surface 222 of the base member 202 during use to support strapping the bottom unit 10 onto a flatbed truck. Detachment of the second insert 204 from the top surface 222 removes the second insert 204 as an obstruction to a strap 11 laid across the top surface 222, and provides for a more secure fit of the strap to the bottom unit 10.

Referring now to FIGS. 9, 10, and 13, the base insert 204 may be set into a first socket 228. The first socket 228 may comprise a recess in the top surface 222 of the base member 202. The first socket 228 may further comprise a perimeter having a shape configured to receive a bottom portion of the second insert 204. The shape of the perimeter may be substantially similar and be configured to fit closely with the bottom portion of the second insert 204 to prevent the second insert 204 from sliding along the top surface 222.

Referring to FIG. 13, a boss 229 may extend from the bottom surface of the impression of the first socket 228. The boss 229 may be configured to mate with a second socket 231 set in an under side of the second insert 204. The boss 229 and second socket 231 may prevent the second insert 204 from sliding along the top surface 222. A fastener aperture 237 may pass through at least a portion of the boss 229.

Referring to FIGS. 9 and 13, the second insert 204 may further comprise a third socket 233 comprising a recess in the top surface 210 of the second insert 204. The third socket 233 may comprise a depth and width to accommodate insertion of tools for insertion, actuation, or removal of a fastener, such as accessing a screw or bolt head. A fastener channel 235 may extend between the third socket 233 and the second socket 231 to allow a portion of a fastener, such as a screw or bolt, to pass from the top surface 210 of the second insert 204 to the boss 229.

When the second insert 204 is set into the first socket 228, the boss 229 and the second socket 231 will mate and align. The fastener channel 235 and the fastener aperture 237 will also align. A fastener (shown in FIG. 16B), such as a metal or plastic screw, may be passed into the fastener channel 235. A bottom surface of the third socket 233 may catch a head portion of the fastener 246 and be tightened against it to secure the second insert 204 to the second base member 202.

Referring to FIGS. 12, 13, and 14, the second insert 204 may be detached from the top surface 222 of the second base member 202 by loosening and removing the fastener (not shown). A socket wrench or a screwdriver may be inserted into the third socket 233 to remove the fastener.

In some embodiments, the second insert 204 may remain attached to the second base member 202 even after it is removed from the top surface 222. A hinge 239 may couple the second insert 204 to the second base member 202. The hinge 239 may comprise a band, strip or ribbon of flexible material extending between the second insert 204 and a portion of the second base member 202.

Referring to FIG. 14, the hinge 239 allows the second insert 204 to be removed from the top surface 222 to allow a strap to be set on the top surface 222. The hinge 239 may prevent the second insert 204 from being lost. The hinge 239 also allows the second insert 204 to be replaced and re-attached on the top surface 222 for re-use in stacking the top unit 20 on the bottom unit 10.

In some embodiments, the second base member 202, the second insert 204, and the hinge 239 are formed from the same material and may be formed as one continuous piece. For example, the stacking bracket 200 may comprise one piece of molded plastic, as shown in FIG. 13.

In some embodiments, the slope may change in a positive manner from the base of the sloped surface 206, 208 to the top of the second insert 204. For example, in FIGS. 15, 16A, and 16B, the sloped profile comprises a step change in slope from the first set of sloped surfaces 206, 208 to the second set of sloped surfaces, which are shown as extension sides 242a, b, c. The increase in slope from the first set to the second set of sloped surfaces increases the energy required to move the top unit 20 up and over the second insert 204, which may prevent disengagement of the top unit 20 from the bottom unit 10 during transport of the units 10, 20.

Figure 15:
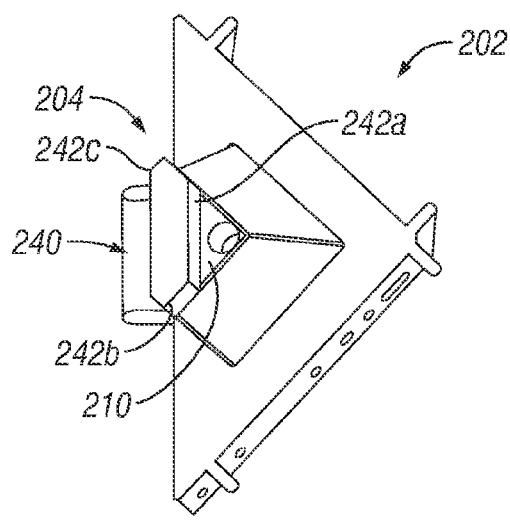
FIG. 15 is a perspective view of a second stacking bracket having an extended segment extending from a second insert.
Figure 16A:
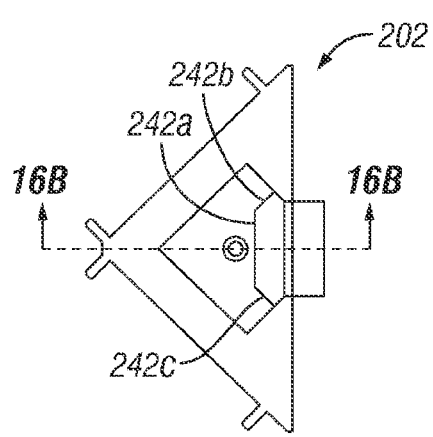
FIGS. 16A and 16B are a top view and a cross-sectional view taken along line 16A-16A shown in FIG. 16A of a second stacking bracket having an extended segment extending from a second insert.
Figure 16B:
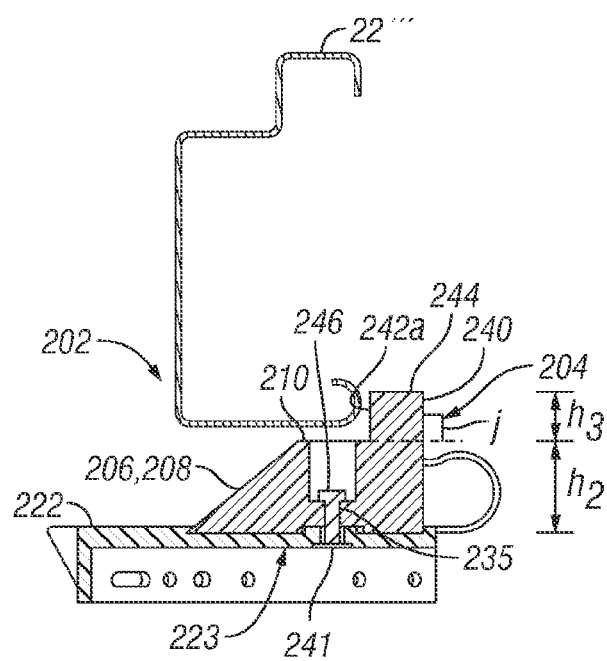

Referring to FIGS. 15, 16A, and 16B, the second insert 204 may further comprise an extended segment 240. The extended segment 240 may comprise a prismatic shape extending above the top surface 210 of the second insert 204 to a height $h_3$. The prismatic shape may be configured with the extension sides 242a, b, c having a slope (i.e. angle j) relative to the top surface 222 of the second base member 202 greater than the slope of the sloped surfaces 206, 208. In the embodiment shown, the extension sides 242a, b, c comprise a substantially vertical slope. It will be understood by persons of ordinary skill that the slope of the extension sides 242 a, b, c may comprise a non-vertical slope (e.g. less than 90 degrees).

Referring to FIGS. 15, 16A, 16B, the sloped surfaces 206, 208 may resist disengagement of the top unit 20 from its stacked configuration, when the top unit 20 is rocked or bumped to disturb its placement on the bottom unit 10. The extension side surfaces 242a, b, c may function as a ramp or an impact surfaces or both, in a manner similar to that described for the sloped surfaces 206, 208.

The extension side surfaces 242a, b, c may have an added function of extending at a greater height above the underlying top surface 222 than the sloped surfaces 206, 208 to prevent disengagement of the top unit 20 from the bottom unit 10. For example in FIG. 16B, in response to a violent shock to the top unit 20, the rail 22''' may rise above the top surface 222 and impact the extension side surfaces 242a, b, c. The impact may cause the rail 22''' to recoil and return to the at-rest position shown in FIG. 10, showing the rail 22' in the at-rest position.

As shown in FIG. 10, the extension side surfaces 242a, b, c may extend above the top surface 222 to a height $h_3$ above the top surface 210 of the second insert 204 from a first surface 244. The height $h_3$ may comprise about 0.75 in. within a range of about 0.5-2.0 in. The extended segment 240 may be formed integrally from the same material as the second insert 204. In other embodiments, the extended segment may be removable and re-attachable from the second insert 204, or made from a different material.

In some embodiments, as shown in FIGS. 16A and 16B, the fastener 246 used to secure the second insert 204 to the second base member 202 may comprise a machine screw configured to threadably couple with a blind nut 241. The blind nut 241 may be secured to the undersurface 223 opposite from the top surface 222. The blind nut 241 may be pressed into the undersurface 223, which may comprise a plastic material. The machine screw may be driven in from the top through the fastener channel 235 and the fastener aperture 237, in the same manner described in FIG. 12A. In some embodiments, the blind nut 241 is configured to threadably couple with a 10-32 machine screw in place of a sheet metal or plastic screw. The blind nut 241 may be recessed into the plastic of the undersurface 223 to prevent damage to the top surface 222.

Referring to FIG. 14, the support members 215a-d and the side surfaces 207a and 207b of the second insert 204, when the second insert 204 is in the unfolded position, may aid in locating and locking the strap in place on the top surface 222 to prevent slipping or sliding of the strap along the top surface 222. For example, one side of strap may contact a portion of the support member 215c and another side of the strap may contact the side surface 207c.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for supporting stacking of a top heating, ventilation, and air conditioning (HVAC) unit on top of a bottom HVAC unit, the apparatus comprising:

a base member configured to mount to a top cover of the bottom HVAC unit at a corner of the top cover, wherein the base member comprises an upper base portion substantially triangular shaped comprising a base member top surface configured to receive at least a portion of a base rail of the top HVAC unit and formed with a first hole, the upper base portion further comprising a first flange extending from the base member top surface and a second flange extending from the base member top surface;

a stacking insert sized and configured to at least partially pass through the first hole in the base member top surface, the stacking insert extending away from the base member, wherein the stacking insert comprises a first sloped surface and a second slope surface both-extending above the base member top surface, and wherein the base member top surface extends from a base portion of the first sloped surface and the second slope surface in a plane substantially parallel to the top cover of the bottom HVAC unit, when the base member is mounted to the top cover of the bottom HVAC unit; and wherein when the base member is mounted to the top cover of the bottom HVAC unit and the top HVAC unit is disposed on the top cover of the bottom HVAC unit, the first sloped surface faces an inner wall of a first portion of the base rail and the second sloped surface faces an inner wall of a second portion of the base rail, wherein the first portion of the base rail is orthogonal to the second portion of the base rail thereby forming a corner of the base rail.

2. The apparatus of claim 1, wherein the first sloped surface extends in a direction substantially parallel to the inner wall of the first portion of the base rail and the second slope surface extends in a direction substantially parallel to the inner wall of the second portion of the base rail.

3. The apparatus of claim 2, wherein the first sloped surface comprises a first sloped profile, and wherein the first sloped profile comprises a constant slope.

4. The apparatus of claim 3, wherein the constant slope is equal to a slope in the range of 30-70°.

5. The apparatus of claim 3,
wherein the base member further comprises a lower base member substantially triangular shaped; and
wherein the lower base member is separable from the upper base member and is configured to be positioned between the base member top surface and the top cover of the HVAC bottom unit for providing separation between a base rail of the HVAC top unit and the top cover of the HVAC bottom unit.

6. The apparatus of claim 5, wherein the lower base member is comprised of corrugated plastic.

7. The apparatus of claim 6, wherein the upper base member is comprised of sheet metal.

8. The apparatus of claim 7, wherein the base member is formed with a brace slot extending through the base member top surface, and wherein the stacking insert further comprises a brace member having a tapered shape configured to wedge into the brace slot extending through the base member top surface, and wherein the brace member couples the stacking insert to the base member.

9. The apparatus of claim 8, wherein the stacking insert comprises a gap between the first sloped surface and the second sloped surface; and
wherein the gap is configured to receive a lever device to dislodge the stacking insert from the base member.

10. The apparatus of claim 5, wherein the lower base member comprises a thickness configured to provide separation between the rail of the top HVAC unit and the top cover of the bottom HVAC unit, wherein the separation prevents the rail from contacting the top cover of the bottom unit, due to flexing in the rail from the weight of the top unit.

11. The apparatus of claim 5, wherein the lower base member comprises a thickness configured to provide separation between the rail of the top HVAC unit and the top cover of the bottom HVAC unit, wherein the separation prevents the rail from contacting the top cover of the bottom unit, due to flexing in the rail from the weight of the top unit.

12. The apparatus of claim 1, wherein the stacking insert is separable from the base member top surface to remove the one or more sloped surfaces as an obstruction to the plane in which the base member top surface extends, and wherein the base member top surface extends within a substantially flat continuous and uninterrupted surface for receiving a strap to secure the bottom unit, when the stacking insert is detached from the bottom unit top surface.

13. The apparatus of claim 1, further comprising a hinge coupling the stacking insert to the base member, wherein the stacking insert remains attached to the base member when the stacking insert is removed from the base member top surface.

14. The apparatus of claim 13, wherein the hinge comprises a band of flexible material extending between the stacking insert and a portion of the base member.

15. The apparatus of claim 14, wherein the base member, the stacking insert, and the hinge are made of the same material and are formed as one integrated piece.

16. The apparatus of claim 15, wherein the one integrated piece forming the base member, the stacking insert, and the hinge comprises molded plastic.

17. An apparatus for supporting stacking of a top heating, ventilation, and air conditioning (HVAC) unit on top of a bottom HVAC unit for transportation, wherein the top HVAC unit includes a base rail having four corners attached at a lower edge of the top HVAC unit, and wherein the bottom HVAC unit is enveloped by a top cover having four corners on a top surface, the apparatus comprising:

a base member sized and configured for attaching to the top surface of the top cover at one of the four corners on the top surface, the base member comprising:
a lower base portion substantially triangular shaped, and wherein the lower base portion is for placing at one of the four corners of the top surface, and
an upper base portion substantially triangular shaped comprising a substantially flat top surface and a first flange and a second flange extending from the flat top surface, wherein the upper base portion is sized and configured to at least partially cover the lower base portion while having the first flange and second flange extend beyond the lower base portion, and wherein the top surface of the upper base portion is formed with a first hole; and a stacking insert sized and configured to pass at least partially through the first hole of the base member, the stacking insert comprising:
a top surface having a triangular shape with a first, second, and third edge, the top surface extending in a plane that is substantially parallel to a plane containing the top cover of the bottom HVAC unit when the apparatus is mounted to the top cover of the bottom HVAC unit,
a first substantially sloped surface extending from the first edge of the top surface at an acute angle,
a second substantially sloped surface extending from the second edge of the top surface at an acute angle, and
a brace member extending from the third edge of the top surface for coupling with the upper base portion of the base member.

* * * * *